3,140,286
N-(CHLOROPHENYL)-N-PHENYL-N'-2[(HYDROXY LOWER ALKYL)-PIPERIDINO]-ETHYL UREAS
John W. Cusic, Skokie, and Harman S. Lowrie, Northbrook, Ill., assignors to G. D. Searle & Co., Chicago, Ill., a corporation of Delaware
No Drawing. Filed Jan. 11, 1962, Ser. No. 165,681
3 Claims. (Cl. 260—268)

The present invention relates to N-(3-chlorophenyl)-N-phenyl-N'-dialkylaminoalkylureas. More particularly, it relates to compounds of the formula

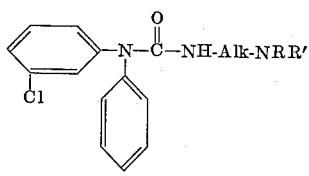

wherein Alk is a lower alkylene radical and —NRR' is selected from the group consisting of (lower alkyl)$_2$N-, piperidino, methylpiperazino, hydroxy(lower alkyl)piperidino and hydroxy(lower alkyl)piperazino. The lower alkyl groups referred to above include both straight- and branched-chain alkyl radicals containing up to 6 carbon atoms and are typified by groups such as methyl, ethyl, propyl, isopropyl, butyl, and hexyl. The lower alkylene radicals referred to above contain more than 1 and less than 7 carbon atoms and are exemplified by groups such as methylene, ethylene, trimethylene, and tetramethylene.

Equivalent to the basic amines of this invention for the purposes here described are their non-toxic acid addition salts and quaternary ammonium salts. Such salts are formed with a variety of inorganic and strong organic acids including sulfuric, phosphoric, hydrochloric, citric, maleic, and related acids. Quaternary ammonium salts are formed with a variety of organic esters of sulfuric, hydrohalic, and aromatic sulfonic acids. Among such esters are methyl chloride and bromide, ethyl chloride, propyl chloride, dimethyl sulfate, methyl benzenesulfate, ethylene chlorohydrin, and allyl bromide.

The compounds of this invention are useful because of their valuable pharmacological properties. In particular, the compounds of the present invention are appetite inhibitors.

3-chlorodiphenylcarbamoyl chloride, obtained by the reaction of 3-chlorodiphenylamine with phosgene, is a convenient starting material for the preparation of the compounds of the present invention. In one approach, the above carbamoyl chloride is reacted with an amine of the formula H$_2$N—Alk—NRR' where Alk and —NRR' are defined as above, to give the compounds of the present invention directly. Alternately, the carbamoyl chloride can be reacted with a chloroalkylamine in the presence of a tertiary amine to give a urea of the formula

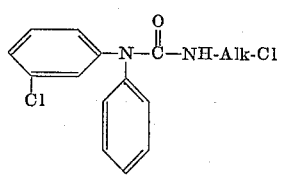

In the case where Alk is ethylene, the carbamoyl chloride can be reacted first with ethylenimine and then with hydrogen chloride to give the intermediate chloroalkylurea. The chloroalkylurea is then reacted with the appropriate secondary amine in an inert solvent such as butanone or benzene to give the compounds of the present invention.

The following examples describe in detail compounds illustrative of the present invention and methods which have been devised for their manufacture. However, the invention is not to be construed as limited thereby, either in spirit or in scope, since it will be apparent to those skilled in the art that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

Example 1

A mixture of 203 parts of 3-chlorodiphenylamine and 80 parts of pyridine in 1300 parts of dry toluene is cooled below 10° C. before a solution of 244 parts of phosgene in 487 parts of toluene is added. The resultant suspension is stirred and cooled in an ice bath for 1 hour and then allowed to stand at room temperature for 4 days. The solution is then decanted from the oily solid which settles and the solvent is evaporated from the solution under reduced pressure to give a red oil which is 3-chlorodiphenylcarbamoyl chloride.

Example 2

A solution of 133 parts of 3-chlorodiphenylcarbamoyl chloride and 1100 parts of anhydrous ether is added, with stirring, to a solution of 65 parts of ethylenimine in 1760 parts of ether. The resultant mixture is allowed to stand for 15 hours before it is filtered. The filtrate is concentrated to 1500 milliliters and a 3-fold excess of hydrogen chloride in 2-propanol is added. The precipitate which forms is filtered off and dissolved in chloroform and the chloroform solution is washed with dilute hydrochloric acid before it is dried and concentrated. Heptane is added to the concentrated chloroform solution until the solution becomes cloudy. When the resultant mixture is cooled, a white solid precipitates. This is N-(3-chlorophenyl)-N-phenyl-N'-(2-chloroethyl)urea melting at about 149–153° C.

Example 3

A benzene solution of 13.3 parts of 3-chlorodiphenylcarbamoyl chloride is added to a solution of 10 parts of 1-methyl-4-(γ-aminopropyl)piperazine and 5 parts of triethylamine in benzene and the resultant mixture is allowed to stand for 3 days before it is filtered. The resultant filtrate is extracted with dilute hydrochloric acid and the acid extracts are washed once with water and then made strongly alkaline with dilute potassium hydroxide solution. The basic solution is extracted with ether and the ether extracts are washed with water and dried and the solvent is evaporated to give N-(3-chlorophenyl)-N-phenyl-N'-[3-(4-methyl-1-piperazinyl)propyl]urea. This compound has the following formula

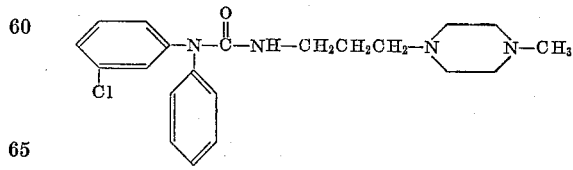

Example 4

If 7 parts of γ-dimethylaminopropylamine is substituted for the 1-methyl-4-(γ-aminopropyl)piperazine of Example 3 and the procedure of Example 3 is repeated, the product is N-(3-chlorophenyl)-N-phenyl-N'-(3-dimethylaminopropyl)urea. This compound is obtained as an oil. It has the following formula

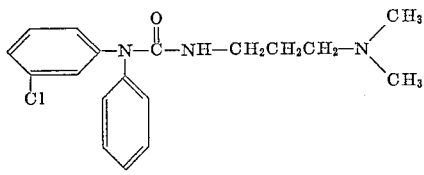

*Example 5*

6 parts of β-dimethylaminoethylamine is substituted for the 1-methyl-4-(γ-aminopropyl)piperazine and the procedure of Example 3 is repeated. Isolation of the product is carried out as in Example 3 to give N-(3-chlorophenyl)-N-phenyl-N'-(2-dimethylaminoethyl)urea. This product is obtained as an oil which crystallizes on standing. It has the following formula

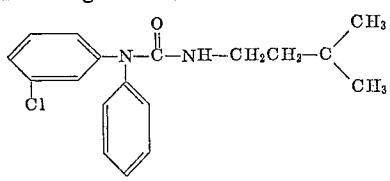

*Example 6*

If an equivalent quantity of β-diethylaminoethylamine is substituted for the 1-methyl-4-(γ-aminopropyl)piperazine and the procedure of Example 3 is repeated, the product is N-(3-chlorophenyl)-N-phenyl-N'-(2-diethylaminoethyl)urea. This compound has the following formula

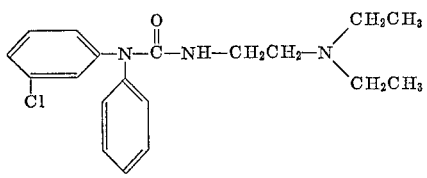

*Example 7*

Substitution of 8.1 parts of 1-(2-aminoethyl)piperidine for the 10 parts of 1-methyl-4-(γ-aminopropyl)piperazine called for in Example 3 affords, by the procedure there described, N-(3-chlorophenyl)-N-phenyl-N'-piperidinoethyl)urea, of the formula

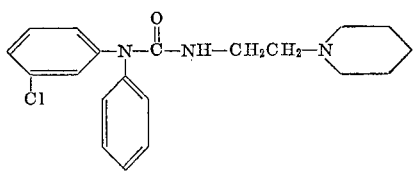

*Example 8*

A mixture of 12.4 parts of N-(3-chlorophenyl)-N-phenyl-N'-(2-chloroethyl)urea, 13 parts of 1-(β-hydroxyethyl)piperazine and 3 parts of sodium iodide and 320 parts of butanone is stirred and refluxed for 12 hours. The resultant mixture is filtered and the solvent is evaporated to dryness under reduced pressure. The residue is dissolved in benzene and extracted with dilute hydrochloric acid. The combined acid extracts are washed once with ether before they are made strongly basic and extracted with chloroform. The solvent is evaporated from the dried chloroform solution and the resultant residue is recrystallized from a mixture of acetone and hexane to give N-(3-chlorophenyl)-N-phenyl-N'-{2-[4-(2 - hydroxyethyl) - 1 - piperazinyl]ethyl}urea melting at about 96–98° C. This compound has the following formula

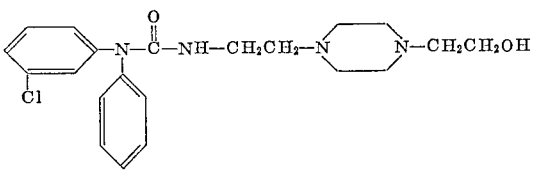

*Example 9*

A mixture of 12.4 parts of N-(3-chlorophenyl)-N-phenyl-N'-(2-chloroethyl)urea, 13 parts of 4-(β-hydroxyethyl)piperidine and 3 parts of sodium iodide in 320 parts of butanone is stirred and refluxed for 12 hours. The reaction mixture is filtered and the solvent is evaporated from the filtrate under reduced pressure. The residue is dissolved in benzene and extracted with dilute hydrochloric acid and the combined acidic extracts are washed once with ether and then made strongly alkaline. The resultant mixture is extracted with benzene and the benzene solution is dried and solvent is evaporated under reduced pressure. The residual solid is recrystallized from a mixture of benzene and heptane to give N-(3-chlorophenyl)-N-phenyl-N'-{2-[4-(2 - hydroxyethyl)piperidino]ethyl}urea melting at about 114–116° C. This compound has the following formula

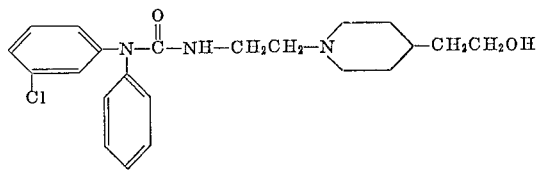

*Example 10*

Substitution of 11.6 parts of 3-hydroxymethylpiperidine for the 13 parts of 4-(β-hydroxyethyl)piperidine called for in Example 9 affords, by the procedure there described, N-(3-chlorophenyl)-N-phenyl-N'-[2-(3 - hydroxymethylpiperidino)ethyl]urea, of the formula

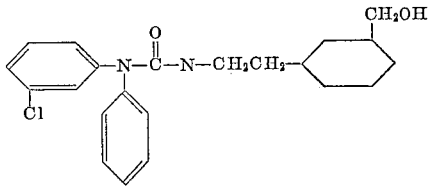

What is claimed is:
1. A compound of the formula

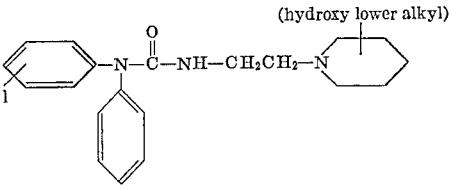

2. N-(3-chlorophenyl)-N-phenyl-N'-{2-[4-(2-hydroxyethyl)piperidino]ethyl}urea.
3. N-(3-chlorophenyl)-N-phenyl-N'-{2-[4-(2-hydroxyethyl)-1-piperazinyl]ethyl}urea.

References Cited in the file of this patent
UNITED STATES PATENTS

| | | |
|---|---|---|
| 2,681,929 | Cusic | June 22, 1954 |
| 2,744,930 | Krapcho et al. | May 8, 1956 |

UNITED STATES PATENT OFFICE
CERTIFICATE OF CORRECTION

Patent No. 3,140,286                  July 7, 1964

John W. Cusic et al.

It is hereby certified that error appears in the above numbered patent requiring correction and that the said Letters Patent should read as corrected below.

In the heading to the printed specification, line 2, in the title of invention, for "ALKYL)-PIPERIDINO]-ETHYL" read -- ALKYL)PIPERIDINO]ETHYL --; column 3, lines 19 to 25, the formula should appear as shown below instead of as in the patent:

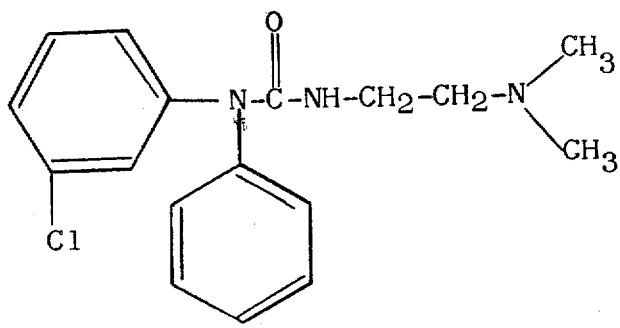

column 4, lines 42 to 49, the formula should appear as shown below instead of as in the patent:

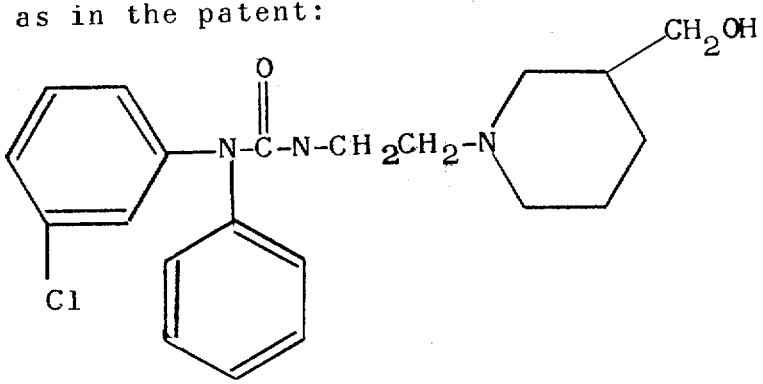

Signed and sealed this 1st day of December 1964.

(SEAL)
Attest:
ERNEST W. SWIDER
Attesting Officer

EDWARD J. BRENNER
Commissioner of Patents